United States Patent [19]

Heess et al.

[11] 4,322,446

[45] Mar. 30, 1982

[54] METHOD AND APPARATUS FOR STABILIZING WINE OR OTHER BEVERAGES

[75] Inventors: Emil Heess, Remshalden-Grunbach; Norbert Hums, Waldstetten; Kurt Krug, Göggingen, all of Fed. Rep. of Germany

[73] Assignee: Schenk-Filterbau Gesellschaft mit beschränkter Haftung, Waldstetten, Fed. Rep. of Germany

[21] Appl. No.: 148,535

[22] Filed: May 9, 1980

[30] Foreign Application Priority Data

Nov. 23, 1979 [DE] Fed. Rep. of Germany ....... 2947200

[51] Int. Cl.$^3$ ............................................. C12G 1/00
[52] U.S. Cl. ................................................ 426/330.4
[58] Field of Search ................. 426/330.4, 422.15, 424

[56] References Cited

U.S. PATENT DOCUMENTS

| | | | |
|---|---|---|---|
| 2,128,432 | 8/1938 | Ramage | 426/422 |
| 3,958,023 | 5/1976 | Butterworth | 426/330.4 |
| 4,112,128 | 9/1978 | Fessler | 426/330.4 |

FOREIGN PATENT DOCUMENTS

384864  3/1973  U.S.S.R. ............................. 426/422

Primary Examiner—Hiram Bernstein
Attorney, Agent, or Firm—Becker & Becker, Inc.

[57] ABSTRACT

A method for stabilizing of wine or other tartaric acid containing beverages. Separation of dissolved wine lees (tartar and/or calcium tartrate) from the beverage is effected by passing the beverage through a deposit or settling layer containing tartar crystals and/or calcium crystals. The disclosure for carrying out the method includes a heat exchanger, a cooler, a dosing container, a stabilizing unit, and a sheet filter. The stabilizing unit has several filter elements arranged one above the other and spaced with respect to each other.

12 Claims, 2 Drawing Figures

METHOD AND APPARATUS FOR STABILIZING WINE OR OTHER BEVERAGES

The present invention relates to a method for stabilizing wine or other tartaric acid containing beverages, including the participation of crystalline wine lees (potassium acid tartrate or tartar and/or calcium tartrate) in connection with temperature reduction.

During the fermentation and storing of wine, for instance, considerable changes arise in the solubility of the wine lees. This requires that the wine lees be continuously separated during the duration of the production process, with the greatest quantity being produced in the course of the fermentation. This separation, however, is almost always incomplete, with wine lees accordingly being present mostly in super-saturated solution. The separation of the supersaturated wine lees, which also is to be understood as equilibrium restoration, then occurs later in the filled bottle, unless previously suitable measures were undertaken to effect the wine less stabilization. Since beverages with crystals visibly deposited at the bottle bottom are considered by consumers as inferior in quality, care must be taken that the necessary separation occurs in the winery.

A method of the initially mentioned type is known (German Offenlegungsschrift 26 40 384) with which, for restoration of the sought stability value, the beverage is first cooled off to the sought stability temperature. The cooled-off beverage is then brought into contact with a relatively large quantity of external or foreign tartar or wine lees, whereby the excess tartar from the solution is deposited or collected on the foreign tartar. The contact time between the foreign tartar and the beverage to be stabilized is approximately two hours. The residual foreign tartar, augmented by the tartar separated from the beverage, can subsequently be removed from the contact container by various mechanical devices.

According to the known method, the tartar can be supplied to the cooled beverage either in loose, finely crystalline form by stirring into the beverage, or by passing the wine or beverage for a longer time along tartar applied upon carriers or supports. The fixation of the tartar upon the carrier, which can comprise different materials, such as synthetic materials or high-grade or high-quality steel, or paper, occurs according to this method by wetting the carrier with a tartar solution and subsequently allowing it to dry thereon, or also by the electrostatic application of pulverized tartar, or by other suitable methods.

This known method, however, has a considerable disadvantage, since the wine which is to be freed of excess tartar must be brought into contact for at least two hours with the foreign tartar supplied in considerable quantities until a stabilization occurs. Moreover, it is known that a satisfactory homogenization or solution treatment of a suspension in large tanks is not unproblematical, especially not when relatively heavy particles are involved, as in this case of tartar crystals. By means of the extensive stirring, the beverage can be heavily loaded with oxygen, which can affect the quality of the beverage.

It is an object of the present invention to create a method which will eliminate the aforementioned deficiencies.

This object, and other objects and advantages of the present invention, will appear more clearly from the following specification in connection with the accompanying drawings, in which.

Figure 1:
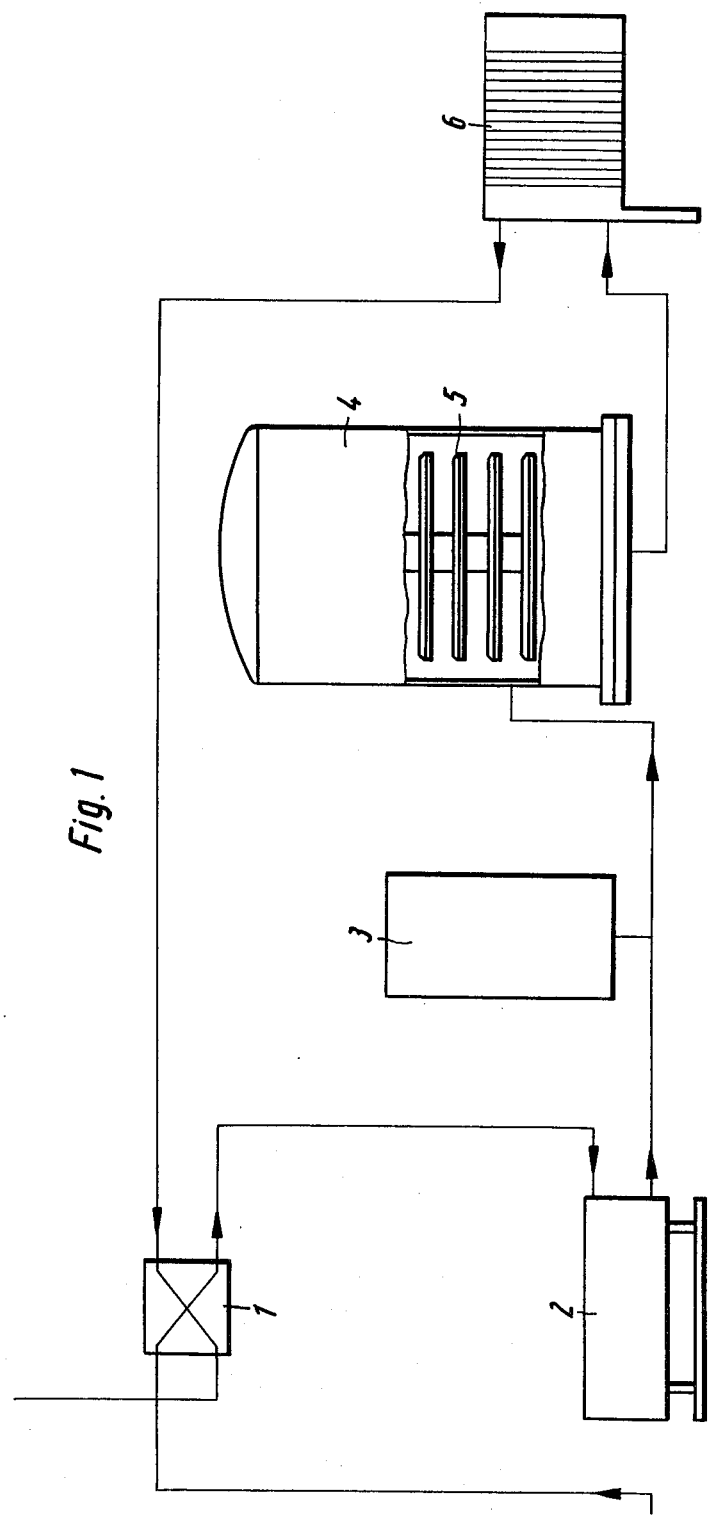
FIG. 1 shows a schematic illustration of a system for tartar or calcium tartrate stabilization in a through-flow method.

The method of the present invention is characterized primarily in that the separation of the excess dissolved wine lees (tartar or calcium tartrate) from the beverage is effected by passing the beverage through a deposit or settling layer containing wine lees (tartar and/or calcium tartrate) crystals.

For this purpose, first a suitable crystal cake is applied to the elements of a horizontal filter. Subsequently, the cooled wine is passed through the formed tartar and/or calcium tartrate cake. In order to preclude that, during possibly occurring pressure impacts of the wine, crystals are pressed through the mesh of the filter elements, a pre-coat or deposit is applied to the filter elements in the form of asbestos/kieselguhr (diatomaceous earth or diatomite). For each square meter of filter surface, approximately 100 g of asbestos and 1 kg of kieselguhr are to be applied, which are introduced one after the other into a dosing vessel or container which is connected with the filter circuit. In place of asbestos, also fine-fiber cellulose can be used, in which case up to 150 g can be applied per square meter. The quantity of tartar or calcium tartrate to be applied ranges from 1 to 2.5 kg/m². The quantity of tartar or calcium tartrate to be applied depends upon the particular wine to be stabilized, since different wines contain different proportions of dissolved wine lees. For preventing incrusting of the tartar cake, it is advantageous to dose a small quantity of a medium guhr. This is especially advantageous when, during cooling-off of the wine to the necessary stabilizing temperature, already fine crystalline tartar or calcium tartrate is deposited. Due to the further cake build-up, the quantitative separation of the dissolved compounds existing in the state of oversaturation occurs already partially ahead of the deposited layer, whereby this layer is correspondingly relieved.

If, in spite of the previous cooling of the wines, no tartar or calcium tartrate is separated, tartar or calcium tartrate can be dosed together with kieselguhr in a ratio of 1:1. The total quantities necessary for this purpose are very small and are in a range of 150–200 g/m²/h. When the wine leaves the settling cake, it is stable with respect to the particular treatment temperature.

With the known contact method, the wine lees to be separated deposits on the offered crystal surfaces, so that in time a coarsening of the added crystals occurs. It is known that approximately two hours are necessary for this crystallization process. The considerably shorter contact times attained by the present invention, however, provide basis for the conclusion that rather than the wine lees being separated by a conventional crystallization process the same is being "filtered off". Since this certainly is not possible with wine lees molecules, it can be assumed that, by cooling-off to temperatures of for instance −3° C. to −4° C., more or less large agglomerates are formed which are retained during passage of the wine through the settling cakes, to be crystallized-out later at the location of their retention. The necessity of a tartar or calcium tartrate bed for retaining the oversaturated dissolved wine lees has been confirmed by tests since, even by the densest asbestos deposits, no removal of the oversaturated dissolved compounds was possible. That an agglomerate formation exists is supported by the fact that for instance a separation of the wine lees occurs with more certainty the lower the temperature to which the clear wine, without in this case to freezing, is previously cooled, even though the solubility of the tartar increases only insignificantly between $-5°$ C. and $0°$ C. Moreover, by way of the strong cooling to below $0°$ C., the hydration, for instance of the tartar molecules, i.e. the surrounding thereof with water molecules, is so strongly forced back that the potassium bitartrate molecules can combine into irregular larger agglomerates, while still remaining dissolved and invisible to the eye. The agglomerates make it possible for them to be separated during passage of the wine through the layer applied on the filter elements, such as for example a layer of wine lees crystals.

At higher pressures, maintaining the through-flow capacity, the effectiveness or efficiency of the method decreases. This indicates that due to the crystallization of the "filtered-off" agglomerates, the agglomerates will in time reduce the pore size of the cake or in part block or clog up the pores; consequently, the porosity of the layer will naturally decrease, so that, while maintaining the same throughput, the speed of the particles in the cake must rise. This results in an increase of the kinetic energy of the particles, so that the separation mechanism no longer is effective or produces any supporting operation, or that the formed agglomerates are broken apart. By the addition of some kieselguhr and/or for instance tartar crystals, the pores of the cake on the filter web or netting can be kept open.

Under certain conditions it is also possible to produce and then to utilize the wine lees of the wine itself. For this purpose, the wine is partially frozen in a contact cooler necessary for the cooling off, whereby as a rule the wine lees, now existing in a strongly oversaturated condition, is separated out very quickly in the form of smallest crystals, i.e., is frozen out. From an intermediate tank, in which for instance the wine lees can deposit, introduction of the wine lees into the cycle occurs and, together with some kieselguhr, the same is deposited onto the filter or screen elements.

If tartar foreign to the respective beverage is used for the stabilization mechanism, it must be of such a state that a high porosity is possible in the cake with a maximum surface area. Very fine-granular tartar with a granular size range between 0.005 and 0.05 mm diameter has proven especially advantageous.

Additionally, the inventive stabilization characteristic also depends upon the thickness of the applied cake. A thickness of 3 mm has proven sufficient. Practical tests have proven that good results are thereby obtained for a throughflow of 750 l/m²/h. In the 13–14 seconds of the throughflow through the cake, the separation of the wine lees, for instance in the oversaturated state, takes place, the condition being that the wine is cooled to near the freezing point.

Referring now to the drawings in detail, the wine flows from a non-illustrated supply tank by way of a pipe system to a heat exchanger 1, and from there to a cooler 2. In the cooler 2, the wine is brought to the temperature necessary for the stabilization. From there, the cooled wine passes to a stabilizing aggregate or unit 4 which has horizontally arranged screen or filter elements 5. Into the conduit connection from the cooler 2 to the stabilizing unit 4, there opens a connection conduit from a container 3 which is used for the predepositing, depositing of the cake, and dosing. From the stabilizing unit 4, the stabilized wine again passes, by way of a layer or sheet filter 6, to the heat exchanger 1, and from there to non-illustrated bottling or storing devices.

Due to the relatively low proportion of crystals necessary for the stabilization, the utilization of crystals of the wine itself is made possible. After termination of the process, the necessary stabilizing crystals can be recovered by dissolving and cleaning in the same device, i.e., in a directly subsequent process. Thus, only one single device is necessary for crystallizing out and separating wine and tartar or calcium tartrate (wine lees).

The stabilization process of the wine is checked with the aid of conductivity measuring therewith. The conductivity or conductance of the wine, after its cooling-off, for instance to $0°$ C., ranges from 1,400–2,200 micro mhos (ohm$^{-1}$). The decrease of the conductivity after passage of the wine through the built-up tartar layer ranges from 50–350 micro mhos.

Figure 2:
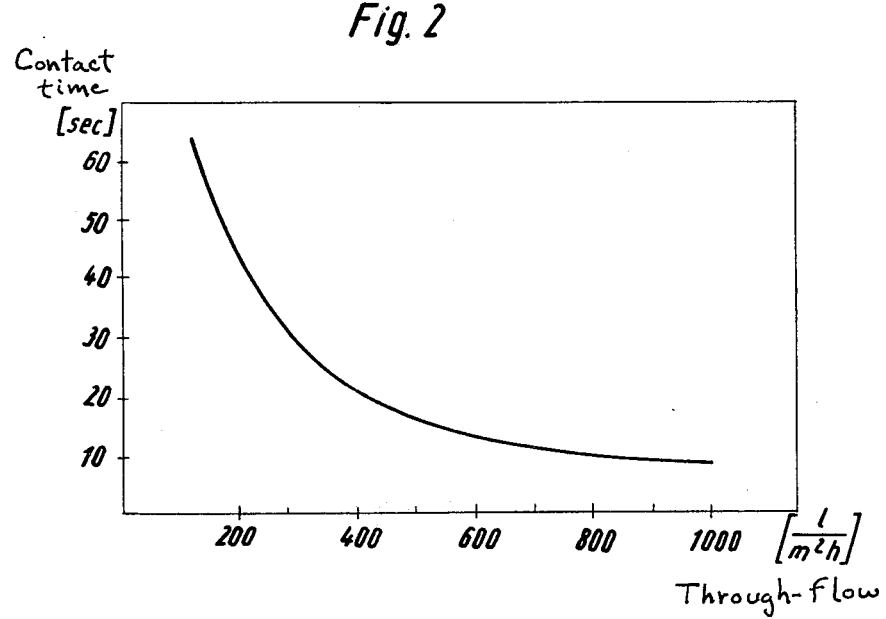
FIG. 2 is a graphic illustration which shows the dependence of the through-flow time through the cake on the through-flow quantity under the above described conditions.

FIG. 2 shows in a graphic illustration the dependence of the through-flow time through the cake on the through-flow with an applied filter cake having a thickness of 3 mm.

In summary, the present invention provides a method (including the participation of crystalline tartar and/or calcium tartrate (wine lees) as well as temperature reduction of the beverage) for stabilizing wine or other tartaric acid containing beverages; the wine or beverages under certain conditions can become cloudy in the presence of potassium and/or calcium ions and consequently the method is characterized in that the separation of the dissolved wine lees occurs by a deposit layer containing tartar or wine lees and/or calcium crystals. The wine lees or calcium crystals used for the deposit layer are obtained from the beverage which is to be stabilized. Before depletion of the deposit layer during the stabilization, wine lees from the wine itself is applied anew to the deposit layer. Alternately, wine lees crystals foreign to the wine, i.e. from another source, form the deposit layer or are used for dosing. The wine lees crystals in the deposit layer preferably have a granular size ranging between 0.005 and 0.05 mm diameter. The quantity of wine lees to be applied is preferably within limits between 1 and 2.5 kg/m². Upon the filter elements having the deposit layer comprising wine lees crystals applied thereto, there is applied a pre-deposit layer in the form of asbestos/kieselguhr, for instance in a ratio of 100 g:1 kg/m². A pre-deposit layer in the form of fine-fiber cellulose/kieselguhr may be applied, whereby the fine-fiber cellulose proportion can amount, for instance, to 150 g/m². The applied deposit layer is preferably at least 3 mm thick. With a normally stabilizable beverage, the through-flow through the deposit layer preferably occurs in an amount of up to 750 l/m²/h at a temperature of, for instance, $-3°$ C. to $-4°$ C.; with beverages that are difficult to stabilize, a reduction of the through-flow speed to substantially lower magnitudes may be necessary; and with beverages that are easily stabilized, the through-flow speed may partly be far in excess of such value. The apparatus for carrying out the foregoing method is characterized by a heat exchanger 1, a cooler 2, a dosing container 3, a stabilizing unit 4, and a layer or sheet filter 6. The stabilizing unit has several filter elements 5 arranged one above the other and spaced with respect to each other.

The present invention is, of course, in no way restricted to the specific disclosure of the specification and drawings, but also encompasses any modifications within the scope of the appended claims.

What we claim is:

1. A method of stabilizing already shiny-bright filtrated clear wine and other beverages containing tartaric acid or potassium hydrogen tartrate dissolved therein, which under certain conditions can become cloudy in the presence of potassium and/or calcium ions, said method comprising in combination the steps of:

first lowering the temperature of said beverage to cool-off the beverage;
   then providing a deposit layer containing crystals selected from the group consisting of wine lees and calcium crystals; and
   finally passing said cooled-off beverage and filtrating the beverage solely through said deposit layer for time measured in seconds to separate out therefrom dissolved wine lees held by said deposit layer without attaining any immediate crystalization on the deposit layer.

2. A wine stabilization method in combination according to claim 1, which includes the step of recovering said crystals from said beverage which is to be stabilized.

3. A wine stabilization method in combination according to claim 2, which includes the step of applying anew wine lees from said beverage itself to said deposit layer prior to depletion of said deposit layer during stabilization.

4. A wine stabilization method in combination according to claim 1, which includes the step of utilizing wine lees crystals from a source other than said beverage to form said deposit layer or to dose same.

5. A wine stabilization method in combination according to claim 1, in which said crystals have a granular size ranging from 0.005 to 0.05 mm diameter.

6. A wine stabilization method in combination according to claim 5, in which said step of providing a deposit layer includes the step of applying wine lees at a rate of 1 to 2.5 kg/m$^2$.

7. A wine stabilization method in combination according to claim 6, in which said deposit layer includes a base of filter elements, and which includes, prior to said applying step, the step of applying a pre-deposit layer in the form of asbestos/kieselguhr to said filter elements.

8. A wine stabilization method in combination according to claim 7, in which said asbestos/kieselguhr is applied at a ratio of about 100 g:1 kg/m$^2$.

9. A wine stabilization method in combination according to claim 6, in which said deposit layer includes a base of filter elements, and which includes, prior to said applying step, the step of applying a pre-deposit layer in the form of fine-fiber cellulose/kieselguhr to said filter elements.

10. A wine stabilization method in combination according to claim 9, in which said fine-fiber cellulose/kieselguhr is applied at a ratio of about 150 g:1 kg/m$^2$.

11. A wine stabilization method in combination according to claim 6, in which wine lees is applied to a thickness of at least 3 mm.

12. A wine stabilization method in combination according to claim 11, which includes the steps of lowering the temperature of said beverage to about $-3°$ to $-4°$ C., and passing said beverage through said deposit layer at a throughflow rate of up to 750 l/m$^2$/h for a normally stabilizable beverage, at a substantially lower rate for a difficult-to-stabilize beverage, and at a partly far greater rate for an easy-to-stabilize beverage.

* * * * *